United States Patent [19]

Edo et al.

[11] Patent Number: 4,823,620

[45] Date of Patent: Apr. 25, 1989

[54] MAGNETOSTRICTIVE DEVICE FOR MEASURING TORSIONAL TORQUE

[75] Inventors: Shouichi Edo, Otaru; Hiroyuki Aoki, Yokohama, both of Japan

[73] Assignee: Nissan Motor Company, Ltd., Japan

[21] Appl. No.: 11,330

[22] Filed: Feb. 5, 1987

[30] Foreign Application Priority Data

Feb. 10, 1986 [JP] Japan .................................. 61-28364
Nov. 5, 1986 [JP] Japan ................................ 61-262009

[51] Int. Cl.⁴ ................................................ G01L 3/10
[52] U.S. Cl. .................................................... 73/862.36
[58] Field of Search ...................................... 73/862.36

[56] References Cited

U.S. PATENT DOCUMENTS 4,416,161 11/1983 Barkhoudarian .
4,506,554 3/1985 Blomkvist et al. .

FOREIGN PATENT DOCUMENTS 741259 11/1943 Fed. Rep. of Germany .
2939620 4/1981 Fed. Rep. of Germany .
57-211030 12/1982 Japan .
59-77326 5/1984 Japan .
59-166827 9/1984 Japan .
59-164931 9/1984 Japan .
60-44839 3/1985 Japan .
0667836 6/1979 U.S.S.R. .......................... 73/862.36
0838448 6/1981 U.S.S.R. .......................... 73/862.36

*Primary Examiner*—Charles A. Ruehl
*Attorney, Agent, or Firm*—Lowe, Price, LeBlanc, Becker & Shur

[57] ABSTRACT

In a device for measuring torsional torque applied to a fixed or revolving shaft made of a magnetic material by producing a magnetic circuit in which the flux path includes a section of the shaft and detecting a magnetostrictive change induced by the torque, the surface of said section of the shaft is formed with a series of parallel grooves and/or lands or protuberances inclining at a suitable angle with the longitudinal axis of the shaft to thereby cause magnetic flux in the surface layer of the shaft to extend approximately in the direction of tensile or compressive stress produced by the torque. It is preferred to form a first series of parallel grooves extending spirally and inclining 45° with said axis in one section of the shaft and a second series of parallel and spiral grooves inclining 45° with said axis and reverse to the first series of grooves in another section of the shaft to detect a difference between magnetostrictive changes in the respective sections.

14 Claims, 12 Drawing Sheets

ANGLE OF TURN (DEGREE)

ANGLE OF TURN (DEGREE)

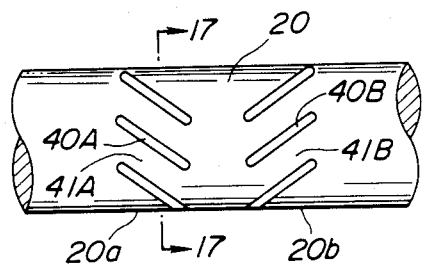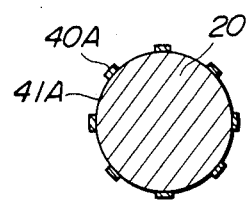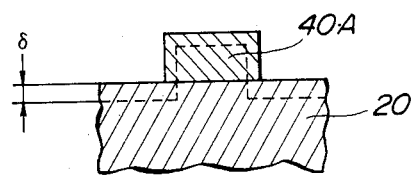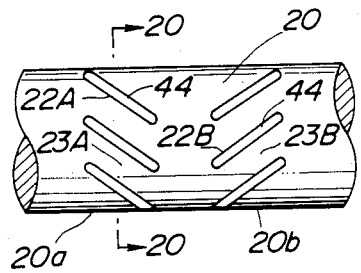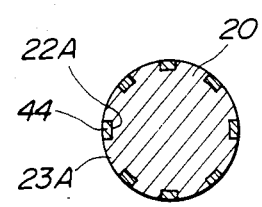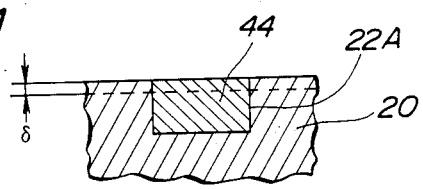

FIG.30
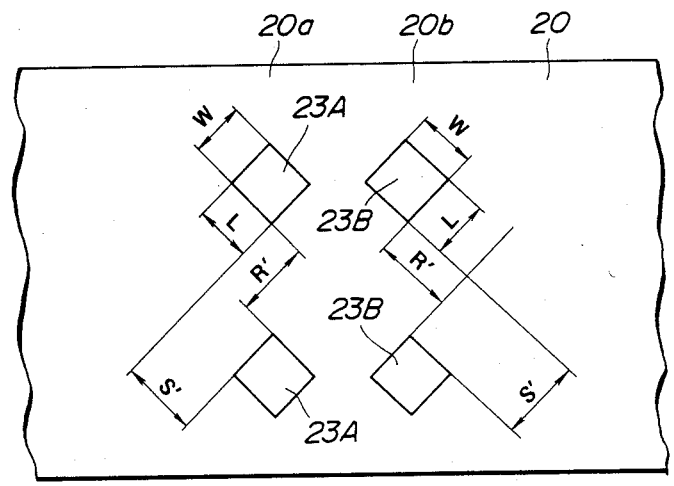
FIG.31(A)        FIG.31(B)
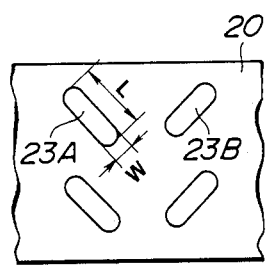 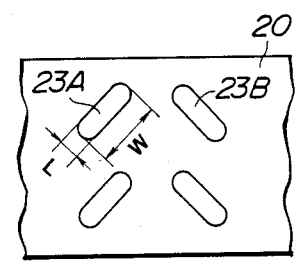
FIG.32
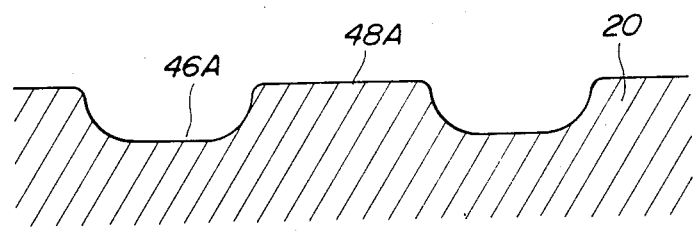

MAGNETOSTRICTIVE DEVICE FOR MEASURING TORSIONAL TORQUE

BACKGROUND OF THE INVENTION

This invention relates to a device for measuring torsional torque applied to a fixed or revolving shaft, which is made of a magnetic material at least in its surface layer, by utilizing a magnetostrictive phenomenon.

It is well known to measure torsional torque applied to a fixed or revolving shaft by a magnetic method utilizing the following phenomena.

The torque produces greater strains in the surface region of the shaft than in the core region, and the torque produces a tensile stress around the shaft surface in a direction inclining to the right or left, depending on the direction of the torque, at an angle of 45° with the direction of the longitudinal axis of the shaft and a compressive stress in the reverse direction at an angle of 45° with the axial direction. When the shaft material is a magnetic material the tensile and compressive stresses cause the magnetic material to exhibit a magnetostrictive effect and induce changes in permeability. That is, the permeability increases in the direction of the tensile stress when the magnetostriction of the shaft material is of the positive type and decreases in the same direction when the magnetostriction is of the negative type.

Torque measuring devices using the above phenomena have at least one exciting coil to produce a magnetic circuit around the shaft to which torque is applied and means to detect a change or changes in permeability of the shaft material.

Conventional torque measuring devices are not yet fully satisfactory in sensitivity and/or accuracy particularly when applied to revolving shafts. The reasons for insufficient accuracy of torque measurement include uneven and locally anisotropic distribution of the permeability of the shaft subject to measurement.

Some proposals have been made for improvements in sensitivity and accuracy of torque measurement by the magnetic method. For example, JP-A No. 59-77326 shows a torque measuring device including a film of a magnetostrictive material such as an iron based amorphous alloy, which is formed with two series of parallel slits and is wrapped around and bonded to the shaft to which torque is applied. On the shaft surface the first series of parallel slits in the film incline at an angle of about 45° with the direction of longitudinal axis of the shaft, and the second series of parallel slits reversely incline at an angle of about 45° with the axial direction. The two series of slits are symmetrical with respect to a plane cross-sectional of the shaft. The device has two exciting coils positioned around the two series of slits, respectively. When torque is applied to the shaft the magnetostrictive film undergoes tensile deformation along one series of parallel slits accompanied by a considerable increase in permeability and compressive deformation along the other series of parallel slits accompanied by a considerable decrease in permeability. Such changes in permeability are detected by a bridge circuit. However, it is a disadvantage of this device that an indispensable adhesive layer between the shaft surface and the slitted magnetostrictive film tends to deteriorate as torque is repeatedly applied to the shaft, as the shaft temperature changes and/or as time passes. Deterioration of the adhesive layer will result in changes in the relationship between the magnitude of torque applied to the shaft and the amount of deformation of the magnetostrictive film and, therefore, in lowering of the accuracy of torque measurement.

SUMMARY OF THE INVENTION

It is an object of the present invention to provide an improved magnetostrictive torque measuring device which exhibits a long stable output characteristic and by which torsinal torque applied to a fixed or revolving shaft can accurately be measured without being influenced by locally anisotropic distribution of permeability of the shaft.

According to the invention there is provided a device for measuring torsional torque applied to a shaft which is made of a magnetic material at least in a surface region thereof, the device comprising an exciting coil positioned close to the shaft so as to produce a magnetic circuit in which the magnetic flux path includes a selected section of the shaft, detection means for detecting a magnetostrictive change induced in the selection section of the shaft by torsional torque applied to the shaft and flux directioning means for differentiating the level of the surface of the shaft in a series of elongate and parallel regions of the selected section. The flux directioning means is integral with the shaft, and the aforementioned elongate and parallel regions are inclining at a predetermined angle with the longitudinal axis of the shaft.

A preferred embodiment of the flux directioning means is a series of elongate and parallel grooves and lands inclining at the predetermined angle, which is preferably 45°, with the longitudinal axis of the shaft. In the grooved section of the shaft the grooves substantially prevent the magnetic flux from extending longitudinally of the shaft and cause a large portion of the flux to extend in the inclined lands in the direction of tensile or compressive stress produced in the shaft by the torque applied thereto. Therefore, an increased change in permeability is produced by the tensile or compressive stress so that the torque detecting sensitivity can be enhanced. By distributing the inclined grooves and lands over the entire circumference of the shaft surface or by spirally extending the grooves it is possible to detect a magnetostrictive change induced by the torque all around the shaft and in an averaging manner. Therefore, turning of the shaft does not cause fluctuations of the output of the torque measuring device.

In the device according to the invention the flux directioning means such as inclined grooves and lands are provided in the shaft itself without attaching any extra part of magnetic material to the shaft. Of course, no adhesive layer is included. Accordingly this torque measuring device does not deteriorate even though torque is repeatedly applied to the shaft.

In a preferred embodiment of the invention two sections of the shaft are each formed with a series of elongate, parallel and inclined grooves and lands, and the grooves and lands in one section are inclined reverse to the grooves and lands in the other section so that the two series of grooves and lands are symmetrical with respect to a plane cross-sectional of the shaft. Around each section an exciting coil is provided. With such arrangement, torque applied to the shaft is measured by detecting a difference between permeability changes in the respective sections. An advantage of this torque measuring device resides in that zero-point of the output does not fluctuate even though permeability of the shaft varies by the influence of temperature or any other factor.

A torque measuring device according to the invention is applicable to a revolving shaft and can accomplish accurate measurement of torque applied to the shaft even when the shaft is revolving at a high rate. In this invention it is possible to utilize, for example, a power transmitting shaft directly as the shaft incorporated in the torque measuring device. Accordingly it is possible to construct a torque measuring device very compactly without using coupling means.

BRIEF DESCRIPTION OF THE DRAWINGS

FIG. 16 is a side view of two oppositely inclining series of ribs formed in the shaft in FIG. 4 in place of the grooves of FIG. 5;

FIG. 17 is a sectional view taken along the line 17—17 in FIG. 16;

FIG. 18 is an enlarged sectional view of one of the ribs in FIG. 16;

FIG. 19 is a side view of a modification of the grooves in FIG. 5;

FIG. 20 is a sectional view taken along the line 20—20 in FIG. 19;

FIG. 21 is an enlarged sectional view of one of the grooves in FIG. 19;

FIGS. 27 to 31(B) are simplified illustrations of the grooves and lands in FIG. 4 for explanation of their width, length and intervals;

FIGS. 32 to 34 show examples of sectional shapes of the grooves and lands in FIG. 22 in enlarged and fragmentary sectional views;

DETAILED DESCRIPTION OF THE INVENTION

Figure 1:
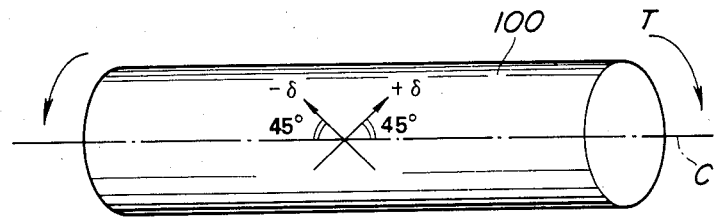
FIG. 1 shows a shaft for explanation of directions of tensile and compressive stresses induced by torsional torque applied to the shaft.

Referring to FIG. 1, torsional torque T applied to a cylindrical bar or shaft 100 of a magnetic material in the clockwise direction with respect to cross-section of the shaft produces a tensile stress $+\sigma$ around the shaft 100 in the right-hand direction at an angle of 45° with the direction of the longitudinal axis C of the shaft and a compressive stress $-\sigma$ in the left-hand direction at an angle of 45° with the axial direction. Assuming that the magnetic material of the shaft 100 exhibits positive magnetostriction, permeability of the shaft 100 increases in the direction of the tensile stress $+\sigma$ and decreases in the direction of the compressive stress $-\sigma$.

Figure 2:
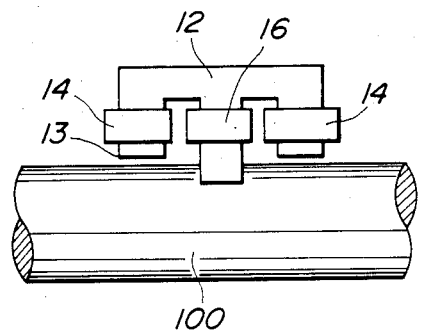
FIGS. 2 and 3 are schematic illustrations in side and front views, respectively, of a pickup part of a conventional torque measuring device.
Figure 3:
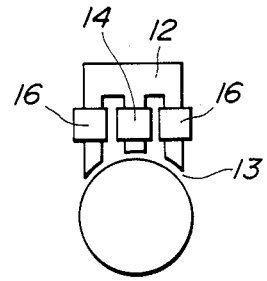

FIGS. 2 and 3 show the outline of the pickup part of a known torque measuring device to detect torsional torque applied to the shaft 100 of a magnetic material. The pickup part has a yoke 12 which is made of a high permeability material such as Permalloy and is positioned close to the cylindrical surface of the shaft 100 so as to leave gaps 13 of a predetermined small width between the shaft surface and the magnetic poles of the yoke 12. A pair of exciting coils 14 to create a magnetic circuit in which the shaft 100 constitutes a portion of the magnetic flux path and a pair of pickup coils 16 are combined with the yoke 12 is a diagonal arrangement. The torque measuring device includes an electric circuit (not shown) which produces an output voltage representing, when torsional torque is applied to the shaft in the clockwise direction, the sum of the increase in permeability due to the tensile stress $+\sigma$ in the right-hand direction inclining 45° from the axial direction and the decrease in permeability due to the compressive stress $-\sigma$ in the left-hand direction inclining 45° from the axial direction. A torque measuring device according to the invention works on the same principle.

FIGS. 4–7 show the pickup part of a torque measuring device as an embodiment of the invention. The pickup part is coupled with a cylindrical shaft 20 to which torsional torque as the object of measurement is applied. The shaft 20, at least in its cylindrical surface region, is made of a magnetic material that exhibits magnetostriction such as, for example, carbon steel or alloy steel such as Ni-Cr-Mo steel or Fe-13Al alloy. The pickup part has a cylindrical yoke 24, which is made of a high permeability material and is positioned around the shaft 20 so as to leave predetermined narrow gaps 25 between the shaft surface and the yoke poles, and a pair of exciting coils 26A and 26B enclosed in the yoke 24.

In a section 20a of the shaft 20 the cylindrical surface is formed with a first series of parallel grooves 22A which are inclined to form an angle of 45° with the direction of the longitudinal axis C of the shaft 20. As a natural consequence the ungrooved regions in this section 20a become a series of parallel lands 23A which incline at the same angle with the grooves 22A. In another section 20b at a short axial distance from the section 20a, the cylindrical surface of the shaft 20 is formed with a second series of parallel grooves 22B inclined in reverse to the first series of grooves 22A and at an angle of 45° with the axis C. The ungrooved regions in this section 20b become a series of parallel lands 23B inclined at the same angle with the grooves 22B. Thus, the first and second series of grooves 22A and 22B are symmetrical with respect to a plane cross-sectional of the shaft 20. In the yoke 24 the exciting coil 26A on the left-hand side is positioned around the first series of grooves 22A in the shaft 20 and the exciting coil 26B on the right-hand side around the second series of grooves 22B. To detect torsional torque T applied to the shaft 20 a predetermined AC voltage is applied to both of the two exciting coils 26A and 26B.

Figure 4:
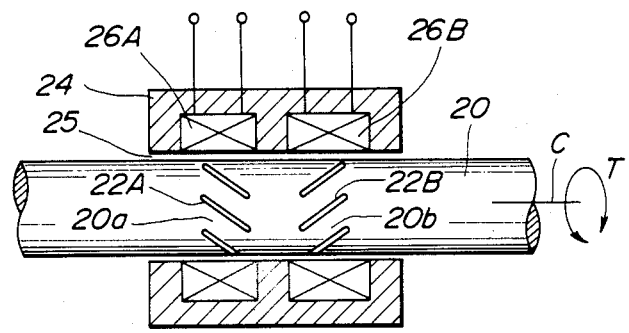
FIG. 4 is a partly schematically sectional side view of a pickup part of a torque measuring device as an embodiment of the invention.
Figure 5:
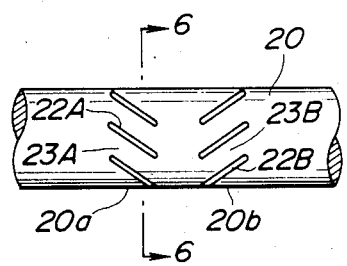
FIG. 5 is a side view of two oppositely inclining series of grooves formed in the shaft in FIG. 4 as an essential means in the device of FIG. 4.
Figure 6:
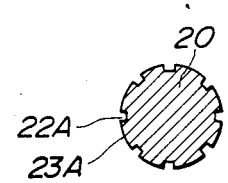
FIG. 6 is a sectional view taken along the line 6—6 in FIG. 5.
Figure 8:
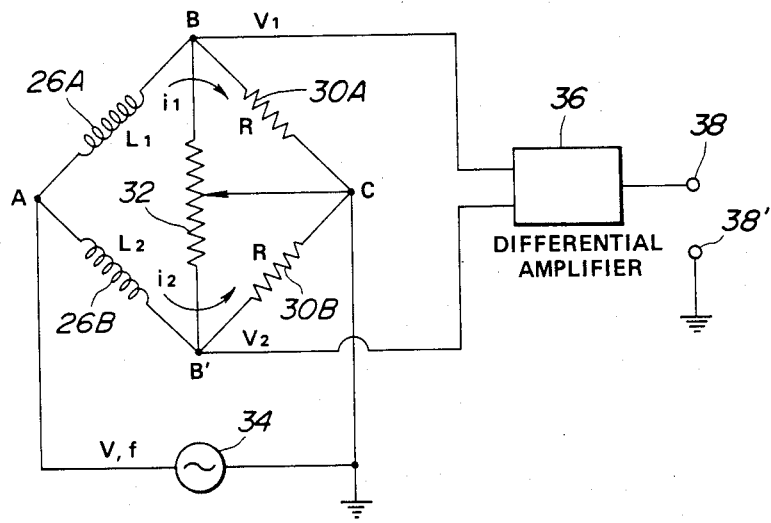
FIG. 8 is a diagram showing an electric circuit for measuring torsional torque by using the pickup part of FIG. 4.

FIG. 8 shows an electric circuit for measuring the torque T by using the pickup part of FIGS. 4–6. The circuit comprises a bridge circuit formed of the exciting coils 26A and 26B which provide inductances $L_1$ and $L_2$, respectively and two fixed resistors 30A and 30B having the same resistance R. Indicated at 32 is a variable rsistance for balancing. As an AC power source an excitation oscillator 34 is connected to the junction points A and C of the bridge circuit to excite the two coils 26A, 26B in the same direction and drive the bridge circuit with a constant AC voltage having an amplitude of V and frequency of f. As the coils 26A and 26B are excited by the AC voltage, lines of magnetic force are produced around each coil 26A, 26B with a magnetic path extending from the shaft 20 to the yoke 24 across one of the gaps 25 and returning to the shaft 20 across another gap 25. To enhance sensitivity of the torque measuring device it is preferable to connect the two exciting coils 26A and 26B such that the two magnetic fields produced by the respective coils are in the same direction.

When the direction of torisonal torque T applied to the shaft 20 is clockwise as shown in FIG. 4 the tensile stress $+\sigma$ induced in the shaft 20 exerts its maximum influence on the lands 23B which are inclined in the same direction as the tensile stress, while the compressive stress $-\sigma$ exerts its maximum influence on the reversely inclining lands 23A. Assuming that the magnetic material of the shaft 20 exhibits positive magnetostriction, tensile straining of the lands 23B causes a considerable increase in permeability whereas compressive straining of the lands 23A of the left-hand side causes a considerable decrease in permeability. Therefore, the inductance $L_1$ of the coil 26A decreases while the inductance $L_2$ of the other coil 26B increases. Reverse phenomena occur when the direction of the applied torque is counter-clockwise with respect to the axis C. By such changes in the inductances $L_1$ and $L_2$ the bridge circuit of FIG. 8 loses balance so that a potential difference arises between the opposite two junction points B and B'. This potential difference is taken out as a torque-indicating output.

In the bridge circuit the current $i_1$ which flows in the arms ABC and the current $i_2$ which flows in the arms AB'C are given by the following equations (1) and (2), respectively.

$$i_1 = V/[R^2 + (2\pi f L_1)^2]^{\frac{1}{2}} \qquad (1)$$

$$i_2 = V/[R^2 + (2\pi f L_2)^2]^{\frac{1}{2}} \qquad (2)$$

Thus, the current $i_1$ (or $i_2$) decreases if inductance $L_1$ (or $L_2$) increases and increases if inductance $L_1$ or ($L_2$) decreases.

The potential $V_1$ at the junction point B and the potential $V_2$ at the opposite junction point B' are given by the equations (3) and (4), respectively.

$$V_1 = i_1 \cdot R \qquad (3)$$

$$V_2 = i_2 \cdot R \qquad (4)$$

The aforementioned potential difference, $V_d$, is defined as follows.

$$V_d = |V_1 - V_2| \qquad (5)$$

Figure 9B:
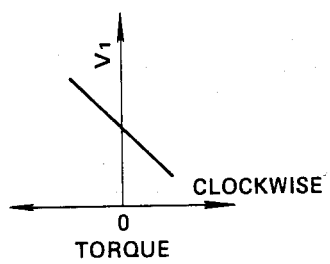
FIGS. 9(A) and 9(B) are charts explanative of changes in the potentials at two junction points in the circuit of FIG. 8 with torisonal torque applied to the shaft clockwise or anticlockwise.
Figure 9A:
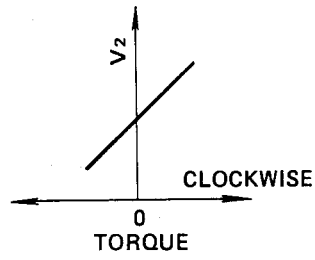
Figure 10:
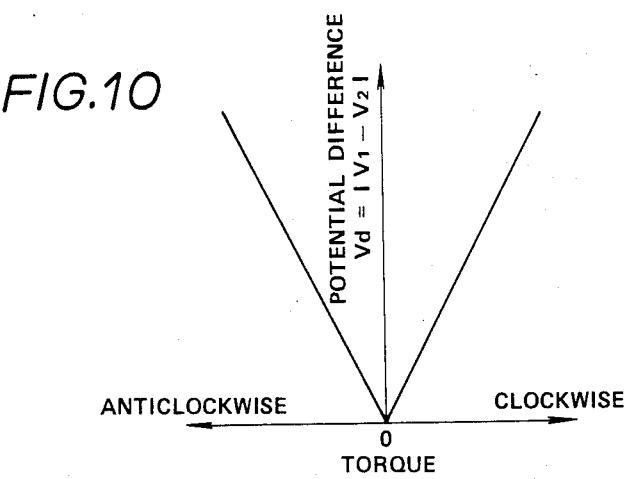
FIG. 10 is a chart explanative of the dependence of the potential difference between the aforementioned two junction points on the direction and magnitude of the torque.

In the torque measuring circuit of FIG. 8 a differential amplifier 36 is used to produce an output voltage which indicates the direction and magnitude of the torque T applied to the shaft 20 and is output at terminals 38, 38'. FIG. 9(A) shows the manner of changes in the potential $V_1$ at the junction point B with the direction and magnitude of torsional torque applied to the shaft 20 in FIG. 4, and FIG. 9(B) shows the same matter with respect to the potential $V_2$ at the junction point B'. FIG. 10 shows the manner of changes in the potential difference $V_d$ with the direction and magnitude of the torque. The potential diffence $V_d$, or the torque indicating output of the above described electric circuit, is linear until the amount of straining of the inclined lands 23A, 23B of the shaft 20 becomes below the order of $10^{-4}$.

The inclined grooves 22A, 22B and lands 23A, 23B according to the invention are formed in order to utilize a skin effect which is exhibited when an electromagnetic wave enters a magnetic material. The skin effect is represented by penetration depth, $\delta$, which is given by the following equation (6) and indicates a depth of penetration of the electromagnetic wave until the amplitude of the wave attenuates to 1/e of the initial value.

$$\delta = 1/(\pi \cdot \mu \cdot \sigma \cdot f)^{\frac{1}{2}} \qquad (6)$$

where $\mu$ is the permeability of the magnetic material and $\sigma$ is the electroconductivity of that material.

Figure 7:
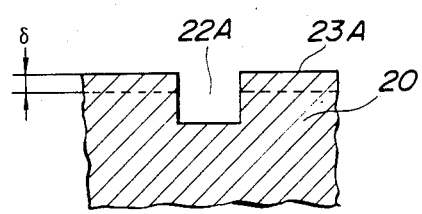
FIG. 7 is an enlarged sectional view of one of the grooves in FIG. 5.

Referring to FIG. 7, the inclined grooves 22A, 22B formed in the shaft 20 have a depth greater than the penetration depth δ of the shaft material. In general it suffices that the grooves 22A, 22B have a depth of about 0.5–1.5 mm on condition that the frequency f of the AC voltage applied to the exciting coils 26A, 26B is sufficiently high. For example, in the case of Fe-13Al alloy which may be used as the shaft material the permeability $\mu$ is $4\pi \times 10^{-5}$ H/m and the electroconductivity $\sigma$ is $10^6 \Omega^{-1} m^{-1}$. Assuming that the input frequency f is $10^4$ Hz, the equation (6) gives about 0.6 mm as the penetration depth δ. In this case the grooves 22A, 22b should be made deeper than 0.6 mm and as deep as about 1 mm in order to enhance the sensitivity of the torque measuring device. In the shaft 20 extending through the magnetic field produced by each exciting coil 26A, 26B the magnetic flux is distributed substantially only in a thin surface layer having a thickness approximately equal to δ. When the grooves 22A, 22B are not formed a large portion of the magnetic flux extends parallel to the longitudinal axis C of the shaft 20. The inclined grooves 22A, 22B interrupt such axial extension of the magnetic flux and causes a large portion of the magnetic flux to extend along the grooves 22A, 22B in the inclined lands 23A, 23B. That is, the inclined grooves 22A, 22B offer a magnetic reluctance and, together with the inclined lands 23A, 23B, produce a geometric anisotropy of magnetism. Consequently, deformation or straining of the shaft 20 by the action of the applied torque produces relatively great changes in permeability in the two sections 20a, 20b of the shaft 20 in the manner as described above. Since the directions of the principal tensile and compressive stresses are each at an angle of 45° with the longitudinal axis of the shaft and are reverse to each other, the sensitivity of the torque measuring device can be most enhanced by inclining the first and second series of grooves 22A and 22B each at an angle of 45° with the axis and reverse to each other.

Figure 11:
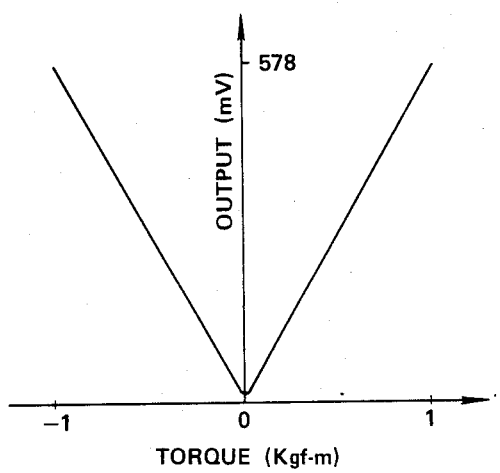
FIG. 11 ia a graph showing an output characteristic of an example of torque measuring devices of the type shown in FIG. 4.
Figure 12:
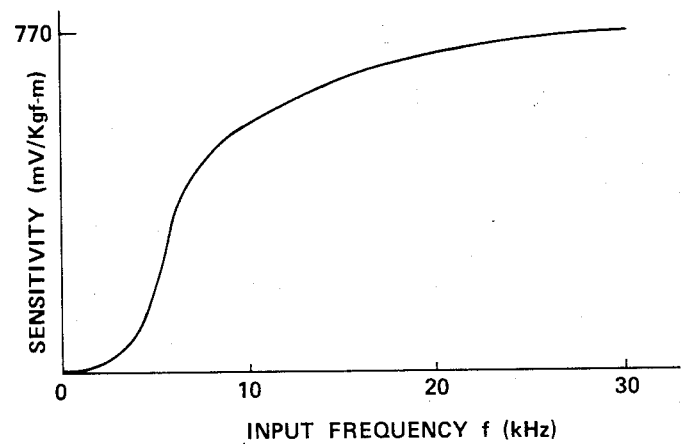
FIG. 12 is a graph showing the dependence of the sensitivity of a torque measuring device of the type shown in FIG. 4 on the frequency of an AC voltage applied to exciting coils in the device.

Consideration should be given to the fact that the penetration depth δ increases as the input frequency f is lower. If the frequency f is so low that the penetration depth δ becomes greater than the depth of the grooves 22A, 22B the sensitivity of the torque measuring device becomes very low because of a considerable increase in the progress of magnetic flux in the longitudinal direction of the shaft. As the frequency f is raised, increased eddy current is generated in the shaft 20. The eddy current has a gradient distribution radially of the shaft to become strongest in the core region and zero on the cylindrical surface. Therefore, magnetization on the shaft surface can follow a change in the external magnetic field while magnetization in the interior region is obstructed. A preferred range of the frequency f of the AC voltage applied to the exciting coils 26A, 26B is from about 1 kHz to about 100 kHz. By using such a high-frequency voltage it is possible to obtain a sufficiently high-sensitivity and low-hysteresis output characteristic. FIG. 11 shows an output characteristic which the torque measuring device of FIGS. 4–8 exhibited when the shaft material characteristics and the input frequency were as mentioned above with references to FIG. 7. FIG. 12 shows the dependence of the same device on the input frequency f. It is seen that the sensitivity can be greatly enhanced by raising the input frequency f to 10 kHz or above to thereby fully utilize the skin effect.

Figure 13:
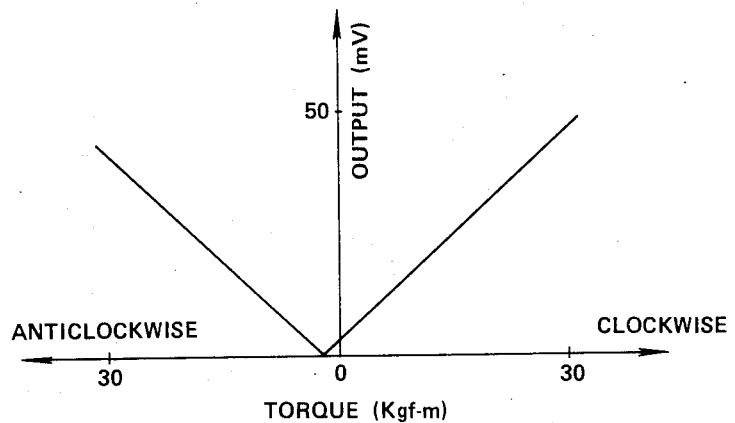
FIG. 13 is a graph showing an output characteristic of a conventional torque measuring device.
Figure 14:
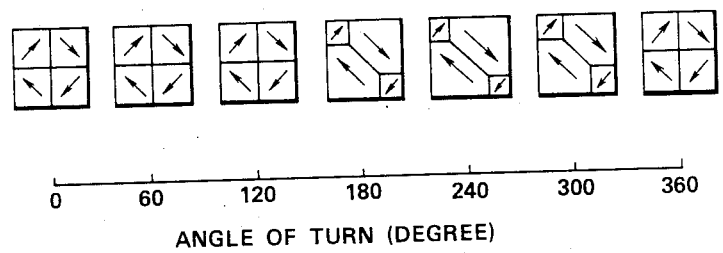
FIG. 14 is a chart explanative of a locally anisotropic distribution of magnetic permeability in a surface region of an ordinary shaft.
Figure 15:
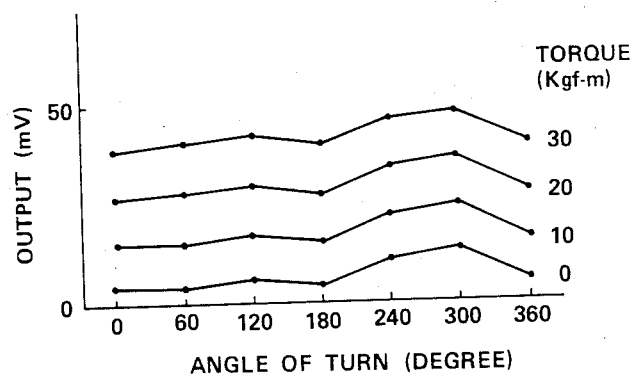
FIG. 15 is a chart showing the manner of changes in the output of a conventional torque measuring device exhibited during one turn of the shaft under measurement.

FIG. 13 shows an output characteristic of the known torque measuring device of FIGS. 2 and 3 in which the shaft 100 is formed with neither grooves nor lands or other projections. It is seen that the output of the torque measuring device does not become zero when no torsional torque is applied to the shaft 100. This is attributed mainly to some inaccuracy in machining of the magnetic poles of the yoke 12, minute disorder in the arrangement of the exciting coils 14 and pickup coils 16 and local inequality of the permeability of the shaft 100. The deviation of the zero-torque output from 0 mV offers difficulty in measuring torsional torque of small magnitude. In the same device there is another problem which is attributed to the fact that machining and/or heat treatment of the shaft 100 often leaves the shaft 100 in a locally stressed state. The residual stresses cause the magnetic domain walls in the shaft 100 to transfer to a certain extent and to remain fixed in the transferred state. Therefore, permeability of the shaft 100 has uneven distribution and exhibits anisotropy with respect to the angle of turn of the shaft as illustrated in FIG. 14 for the sake of explanation. When the shaft in such as state is subjected to measurement of torque applied thereto, the output of the torque measuring device under the zero-torque condition takes various values depending on the angle of turn of the shaft about its axis, as shown in FIG. 15. The distribution of permeability with local anisotropy does not disappear when the magnitude of torque applied to the shaft is within a range of usual measurement. Therefore, even when torque of a given magnitude is applied to the shaft the output of the torque measuring device reflects the output values under zero-torque condition and varies depending on the angle of turn of the shaft, as can be seen in FIG. 15.

In the embodiment of the invention shown in FIGS. 4–8 the inclined grooves 22A, 22B are uniformly distributed over substantially the entire circumference of the shaft surface, so that changes in permeability induced by the torque T can be detected over substantially the entire circumference of the shaft. Therefore, the output of the torque measuring device exhibits little change with the angle of turn of the shaft 20. Furthermore, even if the permeability of the shaft material changes with temperature the zero-point of the output can be kept fixed since first and second series of grooves 22A and 22B are inclined in reverse to each other so as to detect a difference between a change in permeability in the section 20a and another change in permeability in the section 20b.

Referring to FIGS. 16–18, the inclined grooves 22A, 22B in the embodiment shown in FIG. 4–8 can be replaced by two series of parallel strips 40A and 40B fixed to the cylindrical surface of the shaft 20. These strips 40A and 40B are inclined and arranged in substantially the same manner as the grooves 22A and 22B in FIGS. 4–6. The material of these strips 40A, 40B is nonmagnetic and, preferably, a highly electroconductive material represented by copper. These strips 40A, 40B are as thin as a film and accordingly can be formed by a plating method. However, both the thickness and width of each strip 40A, 40B are greater than the penetration depth of the shaft material. The replacement of the grooves 22A, 22B by the nonmagnetic strips 40A, 40B is not accompanied by any change in the arrangement of the yoke 24 and exciting coils 26A, 26b in FIG. 4. The nonmagnetic strips 40A, 40B prevent most of the magnetic flux in the thin surface layer (with a thickness nearly equal to the penetration depth δ) of the shaft 20 from extending parallel to the longitudinal axis of the shaft and force a large portion of the magnetic flux to extend parallel to the strips 40A, 40B in regions 41A, 41B bordered by the strips 40A, 40B. Therefore, torque applied to the shaft 20 can be measured with good accuracy and high sensitivity by utilizing the phenomena described with reference to FIGS. 4–8.

Referring to FIGS. 19–21, the inclined grooves 22A, 22B in FIGS. 4–7 may be filled up with a nonmagnetic and, preferably, highly electroconductive material 44 represented by copper such that the nonmagnetic material 44 in each groove 22A, 22B provides an outer surface substantially flush with the cylindrical shaft surface. The addition of the nonmagnetic filler 44 has the effect of further decreasing magnetic flux extending parallel to the longitudinal axis of the shaft 20 and further increasing magnetic flux extending parallel to the inclined grooves 22A, 22B in the lands 23A, 23B and consequently further enhancing the torque detecting sensitivity.

Figure 22:
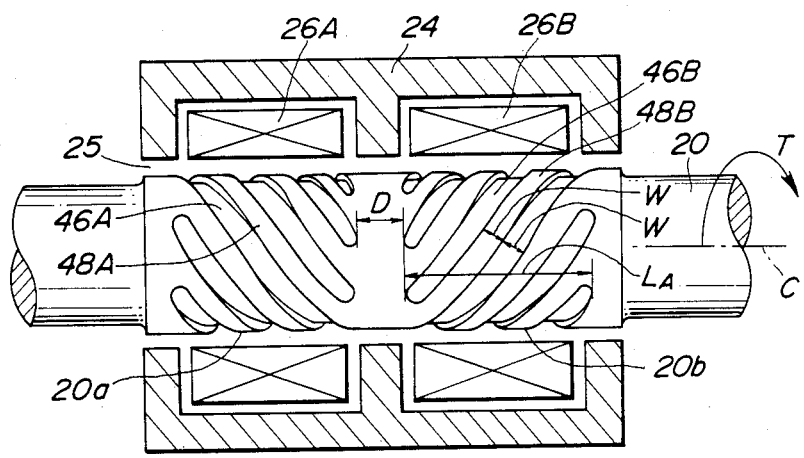
FIG. 22 is a partly schematically sectional side view of a pickup part of a torque measuring device as another embodiment of the invention.

FIG. 22 shows another embodiment of the invention. This embodiment differs from the embodiment shown in FIG. 4 only in the configuration of the inclined grooves and lands formed in the two sections 20a and 20b of the shaft 20. In this embodiment the shaft surface in the section 20a is formed with a series of parallel and spiral grooves 46A, which are inclined at an angle of 45° with the direction of the longitudinal axis of the shaft 20. As a natural consequence of such grooving, parallel and spiral lands 48A are also produced in the same direction as the grooves 46A. In the section 20b on the right-hand side the shaft surface is formed with a series of parallel and spiral grooves 46B, which are inclined in reverse to the firstly mentioned grooves 46A and at an angle of 45° with the longitudinal axis of the shaft 20. Such grooving provides a series of parallel and spiral lands 48B which are inclined in the same direction as the grooves 46B. The modification of the relatively short and nearly linear grooves 22A, 22B in FIG. 4 to the spiral grooves 46A, 46B is not accompanied by any substantial change in the arrangement of the cylindrical yoke 24 and the exciting coils 26A, 26B.

The torque pickup part of FIG. 22 works on the same principle and has the same advantages as the one shown in FIG. 4. However, the spiral grooves 46A, 46B and lands 48A, 48B are more effective in cancelling the unfavorable effect of uneven distribution of permeability in the shaft 20.

Figure 23:
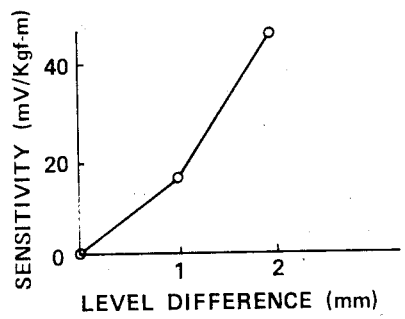
FIG. 23 is a graph showing the dependence of the sensitivity of the device of FIG. 22 on the depth of the spiral grooves shown in FIG. 22.

Usually it suffices that the depth of the grooves 46A, 46B, or the difference in level between the lands 48A (or 48B) and the grooves 46A (or 46B), is in the range from about 0.5 mm to about 1.5 mm on condition that the frequency of AC voltage applied to the exciting coils 26A, 26B is sufficiently high. However, this is not limitative. The depth of the grooves 46A, 46B may be less than 0.5 mm or more than 1.5 mm depending on the degree of the influence of the eddy current mentioned hereinbefore. However, it is undesirable to make the depth of the grooves less than 0.1 mm because of lowering of the torque detecting sensitivity as can be seen in FIG. 23 which shows an experimental result. Although the sensitivity can be enhanced by increasing the depth of the grooves 46A, 46B, consideration should be given to an inevitable increase in the amount of working on the shaft and unfavorable influences of excessively deep grooves on the strength and performance of the shaft as a machine element.

Figure 24:
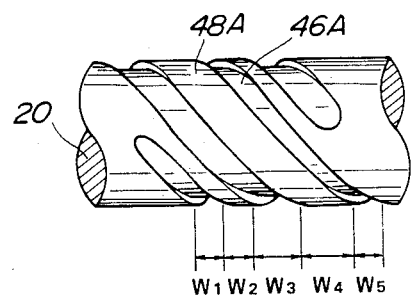
FIG. 24 is a side view of a portion of the shaft in FIG. 22.
Figure 25:
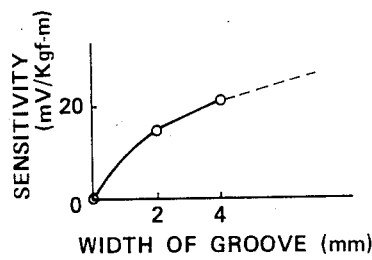
FIGS. 25 and 26 are graphs showing the dependence of the sensitivity of the torque measuring device of FIG. 22 on the widths of the spiral grooves and lands formed in the shaft, respectively.
Figure 26:
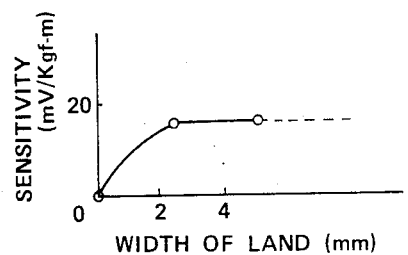

The width (or widths) of the grooves 46A, 46B and lands 48A, 48B is variable insofar as suitable for realization of desired geometric anisotropy of magnetism by the formation of the grooves and lands. For example, in FIG. 22 the grooves 46A, 46B and the lands 48A, 48B have the same width W, which may be about 2 mm. If desired the grooves 46A, 46B and lands 48A, 48B may have variously different widths. In an extreme case, as shown in FIG. 24, the alternately adjacent grooves 46A (46B) and lands 48A (48B) may have irregularly different widths $W_1$, $W_2$, $W_3$, $W_4$ and $W_5$, respectively. FIG. 25 shows the result of an experiment on the dependence of the torque detecting sensitivity on the width of the grooves 46A, 46B. It is seen that the sensitivity is enhanced as the width of the grooves is increased. FIG. 26 shows the result of an experiment on the dependence of the torque detecting sensitivity on the width of the lands 48A, 48B. It is seen that the width of the lands affects the sensitivity only when the width is smaller than a certain value which is not very large. It is suitable to determine the width of the grooves 46A, 46B and lands 48A, 48B with consideration of the relationships shown in FIG. 25 and 26 and according to the diameter of the shaft 20. In most cases the width is greater than about 1 mm, but in the cases of very thin shafts the minimum width is about 0.1 mm.

Figure 27:
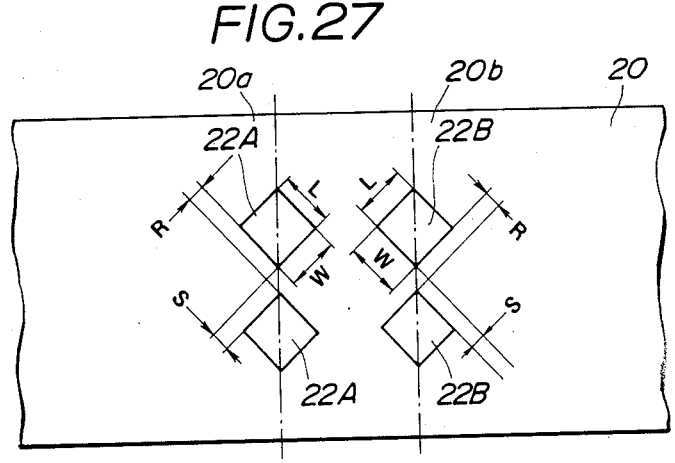
Figure 28A:
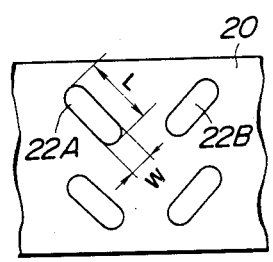
Figure 28B:
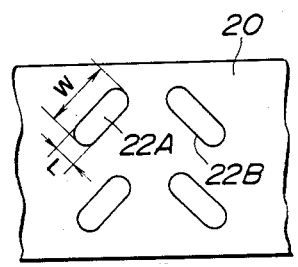
Figure 29:
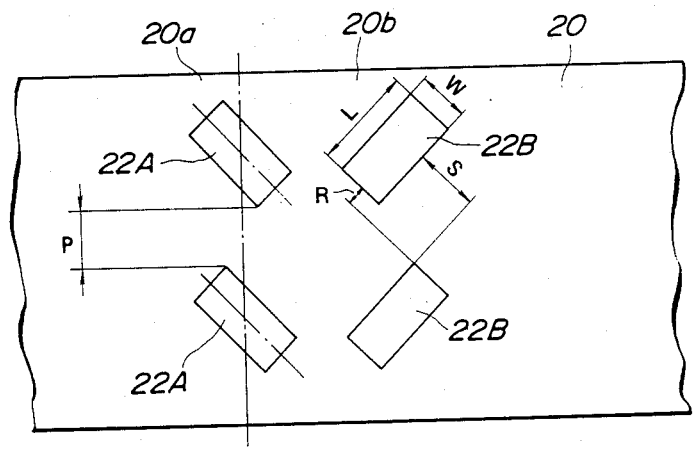

In the embodiment shown in FIG. 22 it is usual that each of the spiral grooves 46A, 46B has a length far greater than it width. Considering also the relatively short grooves 22A, 22B in the embodiment shown in FIG. 4, an explanation of the length and width of each groove is given with reference to simplified illusrations in FIGS. 27–29. In FIG. 27, the length L of each groove 22A (or 22B) is equal to the width W of the groove. Accordingly the widthwise distance R between adjacent two grooves 22A of the same series becomes equal to the lengthwise distance S. With the grooves of such configuration it is impossible to produce geometric anisotropy of magnetism along the grooves. To produce desired geometric anisotropy of magnetism, the length L of each groove 22A, 22B has to be greater than the groove width W, as shown in FIG. 28(A) and also in FIGS. 4 and 22, or smaller than the groove width W as shown in FIG. 28(B). Referring to FIG. 29, if the distance P in the direction circumferential of the shaft 20 between adjacent two grooves 22A (or 22B) of the same series is greater than 0 (zero), geometric anisotropy of magnetism produced by the grooves 22A (or 22B) is sufficient, even though the length L of each groove differs from the width W of the groove, because such distance P allows magnetic flux to extend parallel to the longitudinal axis of the shaft 20. Therefore, it is desired that the distance P be not greater than 0. In other words, it is desirable to arrange each series of grooves such that a line segment drawn on the shaft surface parallel to the longitudinal axis of the shaft always intersects at least one groove, and preferably at least two grooves, within the section 20a and also within the section 20b as is realized by the arrangement of the grooves 46A, 46B in the device of FIG. 22.

Simplified illustrations of FIGS. 30, 31(A) and 31(B) are used for explanation of the length L and width W of the lands 23A, 23B in FIG. 4. If the length L is equal to the width W as shown in FIG. 30, the widthwise distance R' between adjacent two lands 23A (or 23B) of the same series becomes equal to the lengthwise distance S'. The lands of such configuration are not effective in producing geometric anisotropy of magnetism. Therefore, the length L of each land 23A, 23B has to be greater than the land width W, as shown in FIG. 31(A)

and also in FIGS. 4 and 22, or smaller than the land width W as shown in FIG. 31(B).

Figure 33:
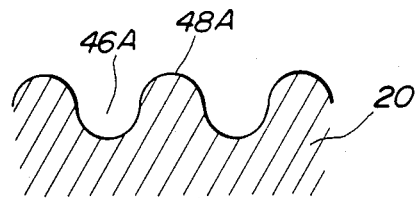

Referring to FIG. 32, it is preferable to round the edges and side walls of the grooves 46A, 46B and lands 48A, 48B in FIG. 22 (and also the counterparts of the device of FIG. 4) to thereby reduce the possibility of being notched and facilitate the grooving working. Furthermore, the grooves 46A, 46B and lands 48A, 48B may be entirely rounded as shown in FIG. 33 to thereby surely prevent breaking of the torsioned shaft 20 by a notch effect and further facilitate the grooving working.

Figure 34:
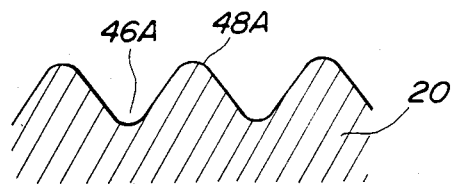

The method of working the shaft 20 to form the grooves 46A, 46B and lands 48A, 48B (or the counterparts of the device of FIG. 4) can be selected from conventional grooving methods including ordinary machining and electric discharge machining. Also it is possible to use a plastic working method, and rolling is a preferred plastic working method because plastic flow produced in the shaft material by rolling has the effect of aligning crystal orientation and consequently augments magnetic anisotropy. By rolling it is possible to form the spiral grooves 46A, 46B and lands 48A, 48B with the cross-sectional shape illustrated in FIG. 34.

Figure 35:
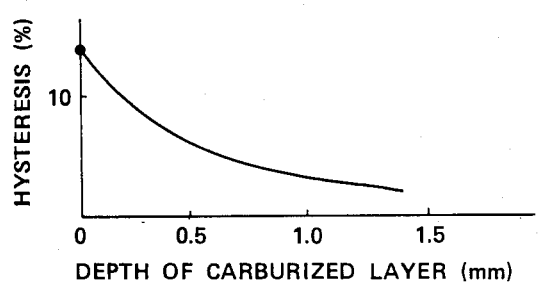
FIG. 35 is a graph showing the relationship between the thickness of a carburized layer produced in the shaft in FIG. 22 and the degree of hysteresis of the shaft.
Figure 36:
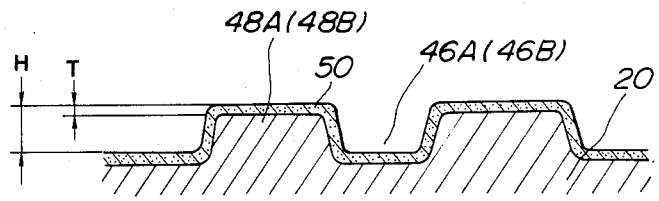
FIG. 36 shows the aforementioned carburized layer in an enlarged sectional view.

After the working to form the grooves 46A, 46B and lands 48A, 48B, it is preferred to subject the shaft 20 to at least one kind of heat treatment such as carburizing, quench hardening and/or tempering. Such heat treatment is effective in enhancing the strength of the shaft 20 and also in stabilizing the magnetic characteristics of the shaft. Particularly, carburizing treatment of the shaft 20 is effective in reducing hysteresis as is evidenced by an experimental result shown in FIG. 35. It is suitable to control the depth of carburization within the range from 0.1 to 1.5 mm. It is not easy to control the depth of carburization to less than 0.1 mm, and in the shaft with such shallow carburization hysteresis is as large as 15–20%, meaning that the shallow carburization is comparable to simple quench hardening or tempering in the effect on hysteresis. On the other hand, carburization to a depth greater than 1.5 mm is uneconomical because of it consumes a very long time and does not result in further and significant decrease of hysteresis. Referring to FIG. 36, it is preferable to carburize the shaft 20 such that in each of the lands 48A, 48B the carburized layer 50 occupies at least 10% of the cross-sectional area of the land. In other words, it is preferable that the ratio of the thickness T of the carburized layer 50 to the total height of each land 48A, 48B is not smaller than 0.1 If the carburized layer 50 is thinner, hysteresis of the carburized shaft 20 will be still larger than 15%.

Figure 37:
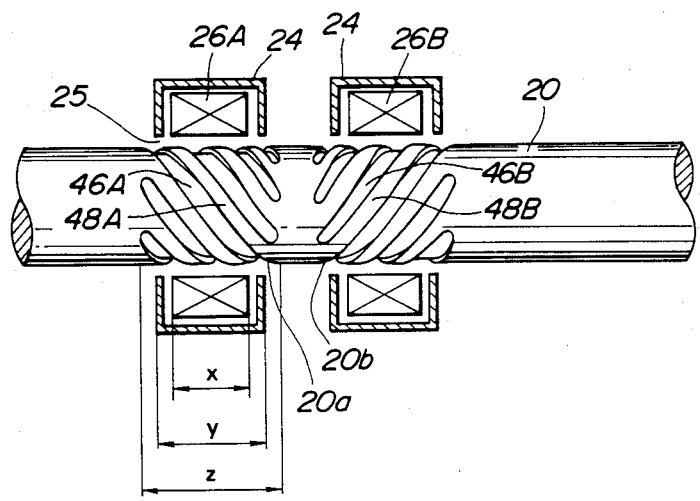
FIGS. 37 and 38 are illustrations of relative widths of the principal elements of the torque pickup part of FIG. 22.
Figure 38:
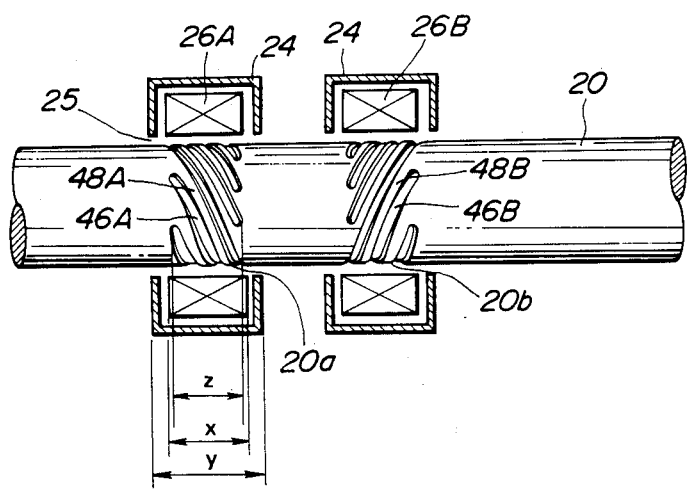

In the device shown in FIG. 22, the length of each exciting coil 26A, 26B in the direction longitudinal of the shaft 20 is approximately equal to the length of each grooved section 20a, 20b of the shaft 20. This is reasonable. In practice, however, slight longitudinal dislocation of the coils 26A, 26B by accidental errors in assembling will cause deviation of the zero-point of the output. For this reason, the arrangement shown in FIG. 37 is preferred. That is, the length z of each grooved section 20a, 20b is made greater than the length x of each exciting coil 26A, 26B, and preferably greater than the length y of the yoke 24 for each coil 26A, 26B. In this case the output of the torque detecting device does not exhibit deviation of the zero-point even if a small error arises in positioning each coil 26A, 26B around each series of grooves 46A, 46B and lands 48A, 48B. Alternatively, the arrangement shown in FIG. 38 can be employed. That is, the length z of each grooved section 20a, 20b may be made smaller than the length x of each coil 26A, 26B. With regard to the torque detecting sensitivity, it is favorable to make the length of each series of grooves 46A, 46B and lands 48A, 48B greater than the length y of the yoke 24 for each coil 26A, 26B because an enlarged surface area of the shaft 20 makes contribution to establishment of geometric anisotropy of magnetism.

In the embodiments shown in FIGS. 4 and 22 the yoke 24 is included with a view to enhancing the sensitivity of the device by reducing leak of the lines of magnetic force. However, the yoke 24 may be omitted depending on the magnitude of the excitation current.

Instead of using the electric circuit shown in FIG. 8 it is possible to use a pair of pickup coils to produce a torque indicating output by measuring changes in the induced electromotive force attributed to changes in magnetic flux in the shaft under measurement.

EXAMPLE

A torque measuring device having a pickup part of the type shown in FIG. 22 and an electric circuit of FIG. 8 was tested.

The shaft 20 was a cylindrical bar 20 mm in diameter made of a nickel-chromium-molybdenum steel (SNCM 420 according to JIS). The grooves 46A, 46B and lands 48A, 48B were shaped spirally as illustrated in FIG. 22. The depth of every groove 46A, 46B was 1 mm from the adjoining land surface. Each series of grooves and lands 46A, 48A; 46B, 48B was inclined at an angle of 45° with the longitudinal axis of the shaft 20. Longitudinally of the shaft 20 the length $L_A$ of each grooved section 20a, 20b was 10 mm, and the distance D between the two sections 20a and 20b was 5 mm. The width W of each groove 46A, 46B was 2 mm, and the width W of each land 48A, 48B was about 2 mm. The grooved shaft 20 was subjected to carburizing treatment. The depth of carburization was about 0.9 mm by taking a Vickers hardness value (Hv) of 550 as the criterion. Therefore, magnetic effects useful for measurement of torque were almost wholly exhibited within the carburized layer.

Each exciting coil 26A, 26B had a winding formed of 44 turns of 0.6 mm copper wire, and the width of the gaps 25 between the shaft 20 and the coils 26A, 26B and yoke 24 was 1 mm. The windings of the two coils 26A and 26B were connected so as to respectively produce magnetic fields in the same direction with a view to enhance the torque detecting sensitivity by making the exciting magnetic fields produced by the two coils 26A and 26B common to the two grooved sections 20a and 20b of the shaft 20. Measurement of torsional torque T applied to the shaft 20 was made by applying a 30 kHz AC voltage to the coils 26A, 26B from the excitatio oscillator 34 in FIG. 8. The excitation current was 400 mA.

Figure 39:
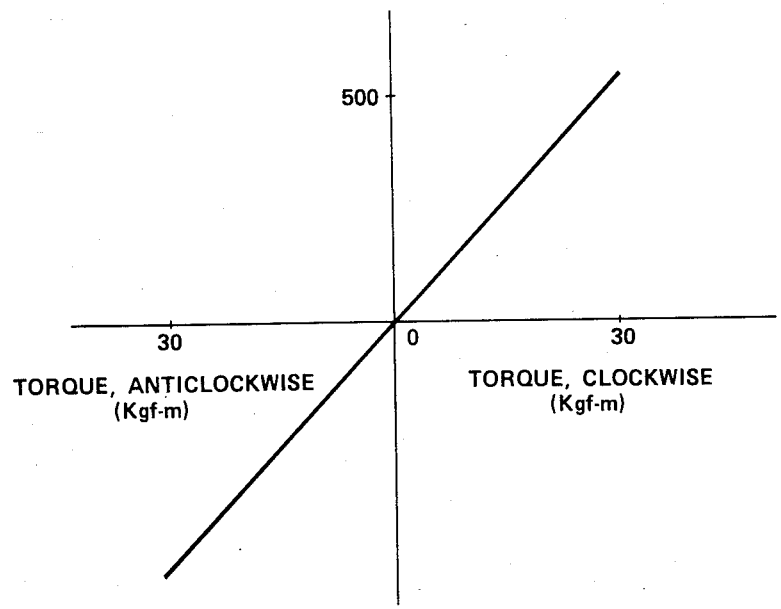
FIG. 39 is a graph showing an output characteristic of an example of torque measuring devices of the type shown in FIG. 22 exhibited when the shaft under measurement was kept at a fixed angle of turn.
Figure 40:
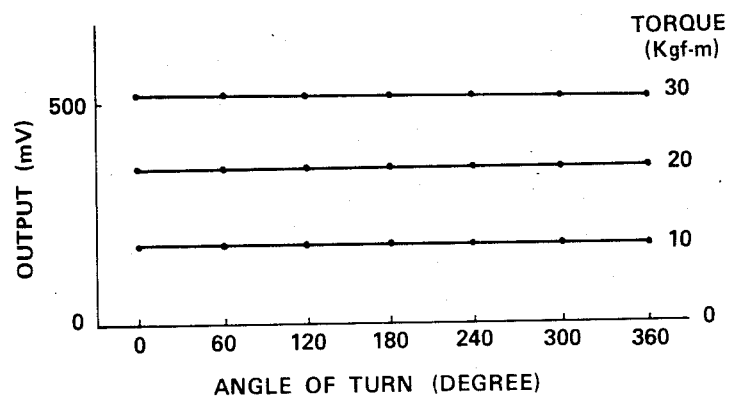
FIG. 40 is a chart showing the manner of changes in the output of the same example device exhibited during one turn of the shaft.

When the shaft 20 was kept fixed at a given angle of turn, the torque measuring device exhibited the output characteristic shown in FIG. 39. Initially the output under zero-tongue condition was adjusted to 0 mV by balancing the bridge circuit of FIG. 8 with the variable resistance 32. After that no change in zero-point was observed. When the shaft 20 was turned about its longitudinal axis the output characteristic of the torque measuring device was as shown in FIG. 40. As can be seen the zero-point exhibited no change during one full turn of the shaft 20, and the relationship between the magnitude of the torque and the output voltage was not the least influenced by angles of turn of the shaft 20.

What is claimed is:

1. A device for measuring torsional torque applied to a shaft made of a magnetic material at least in a surface region thereof, the device comprising:
    an exciting coil positioned close to the shaft so as to produce a magnetic circuit in which the magnetic flux path includes a selected section of the shaft;
    detection means for detecting a magnetostrictive change induced in said section of the shaft by torsional torque applied to the shaft; and
    flux directioning means for differentiating the level of the surface of the shaft in a series of elongate and parallel regions of said section, said flux directioning means being integral with the shaft, said elongate and parallel regions being inclined at a predetermined angle with the longitudinal axis of the shaft, wherein said flux directioning means comprises a series of elongate and parallel grooves formed in the surface of said section of the shaft and inclined at said predetermined angle, wherein the surface region of the shaft is carburized at least in said selected section after forming said grooves.

2. A device according to claim 1, wherein said angle is approximately 45°.

3. A device according to claim 1, wherein said elongate and parallel regions are distributed such that any line segment drawn parallel to the longitudinal axis of the shaft on the surface of said section of the shaft intersects said flux directioning means.

4. A device according to claim 1, wherein said flux directioning means further comprises a series of parallel lands, each of which is bordered by any adjacent two of said grooves.

5. A device according to claim 1, wherein said grooves are shaped and distributed such that any line segment drawn parallel to the longitudinal axis of the shaft on the surface of said section of the shaft intersects at least one of said grooves.

6. A device according to claim 1, further comprising another exciting coil positioned close to the shaft so as to produce a magnetic circuit in which the magnetic flux path includes another section of the shaft, and another series of elongate and parallel grooves formed in said another section and inclined in reverse to said series of grooves in said selected section at said predetermined angle with the longitudinal axis of the shaft, said detection means comprising means for detecting a magnetostrictive change induced in said another section of the sahft by said torque.

7. A device according to claim 6, wherein said detection means further comprises an electric circuit which comprises an AC bridge circuit wherein said exciting coil and said another exciting coil constitute two adjacent arms thereof for detecting magnetostrictive changes induced in said section and said another section of the shaft.

8. A device according to claim 1, wherein said series of grooves in said selected section and said another series of elongate and parallel grooves are substantially symmetrical with respect to a plane cross-sectional of the shaft.

9. A device for measuring torsional torque applied to a shaft made of a magnetic material at least in a surface region thereof, the device comprising:
    an exciting coil positioned close to the shaft so as to produce a magnetic circuit in which the magnetic flux path includes a selected section of the shaft;
    detection means for detecting a magnetostrictive change induced in said section of the shaft by torsional torque applied to the shaft; and
    flux directioning means for differentiating the level of the surface of the shaft in a series of elongate and parallel regions of said section, said flux directioning means being integral with the shaft, said elongate and parallel regions being inclined at a predetermined angle with the longitudinal axis of the shaft, wherein said flux directioning means comprises a series of elongate and parallel grooves formed in the surface of said section of the shaft and inclined at said predetermined angle, wherein the surface region of the shaft is hardened at least in said selected section after forming said grooves.

10. A device according to claim 9, wherein said angle is approximately 45°.

11. A device according to claim 9, wherein said flux directioning means further comprises a series of parallel lands each of which is bordered by any adjacent two of said grooves.

12. A device according to claim 9, wherein said grooves are shaped and distributed such that any line segment drawn parallel to the longitudinal axis of the shaft on the surface of said section of the shaft intersects at least one of said elongate and parallel grooves.

13. A device according to claim 9, further comprising another exciting coil positioned close to the shaft so as to produce a magnetic circuit in which the magnetic flux path includes another section of the shaft, and another series of elongate and parallel grooves formed in said another section and inclined in reverse to said series of grooves in said selected section at said predetermined angle with the longitudinal axis of the shaft, said detection means comprising means for detecting a magnetostrictive change induced in said another section of the shaft by said torque.

14. A device according to claim 13, wherein said series of elongate and parallel grooves in said selected section and another series of elongate and parallel grooves are substantially symmetrical with respect to a plane cross-sectional of the shaft.

* * * * *